June 19, 1934. W. H. PETIT ET AL 1,963,095
AUTOMATIC FILM CAMERA
Filed Jan. 15, 1932  10 Sheets-Sheet 1
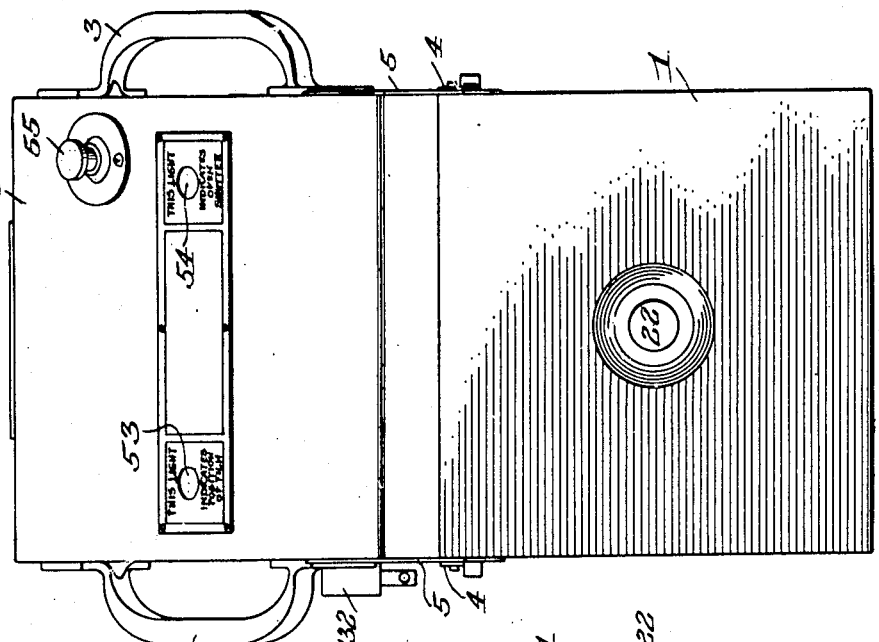
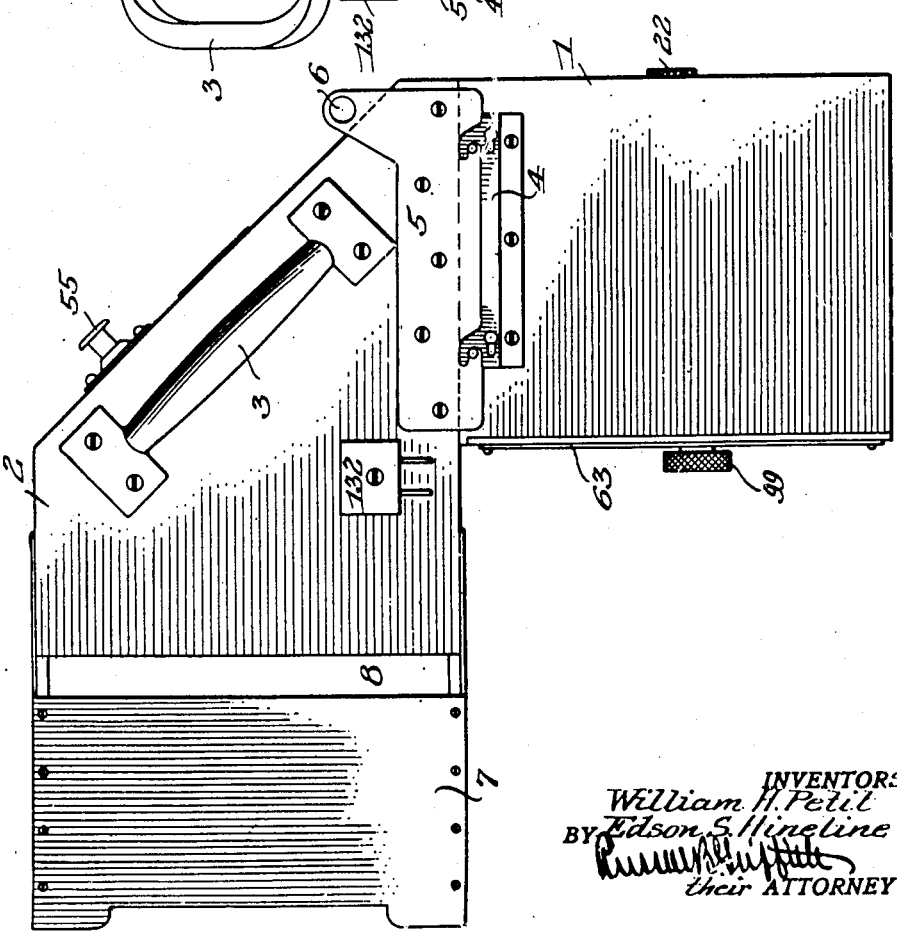
INVENTORS
William H. Petit
Edson S. Hineline
BY
their ATTORNEY

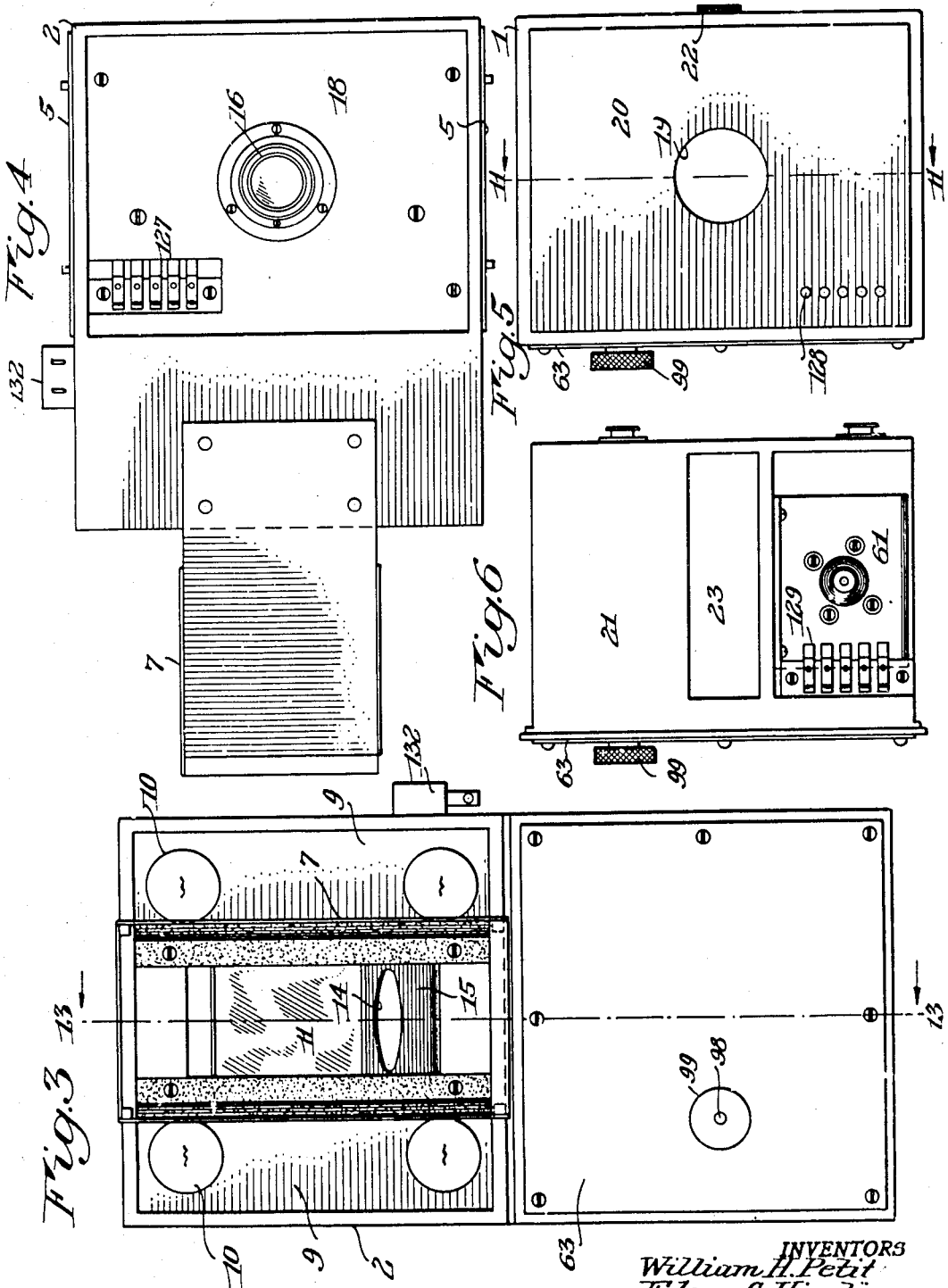

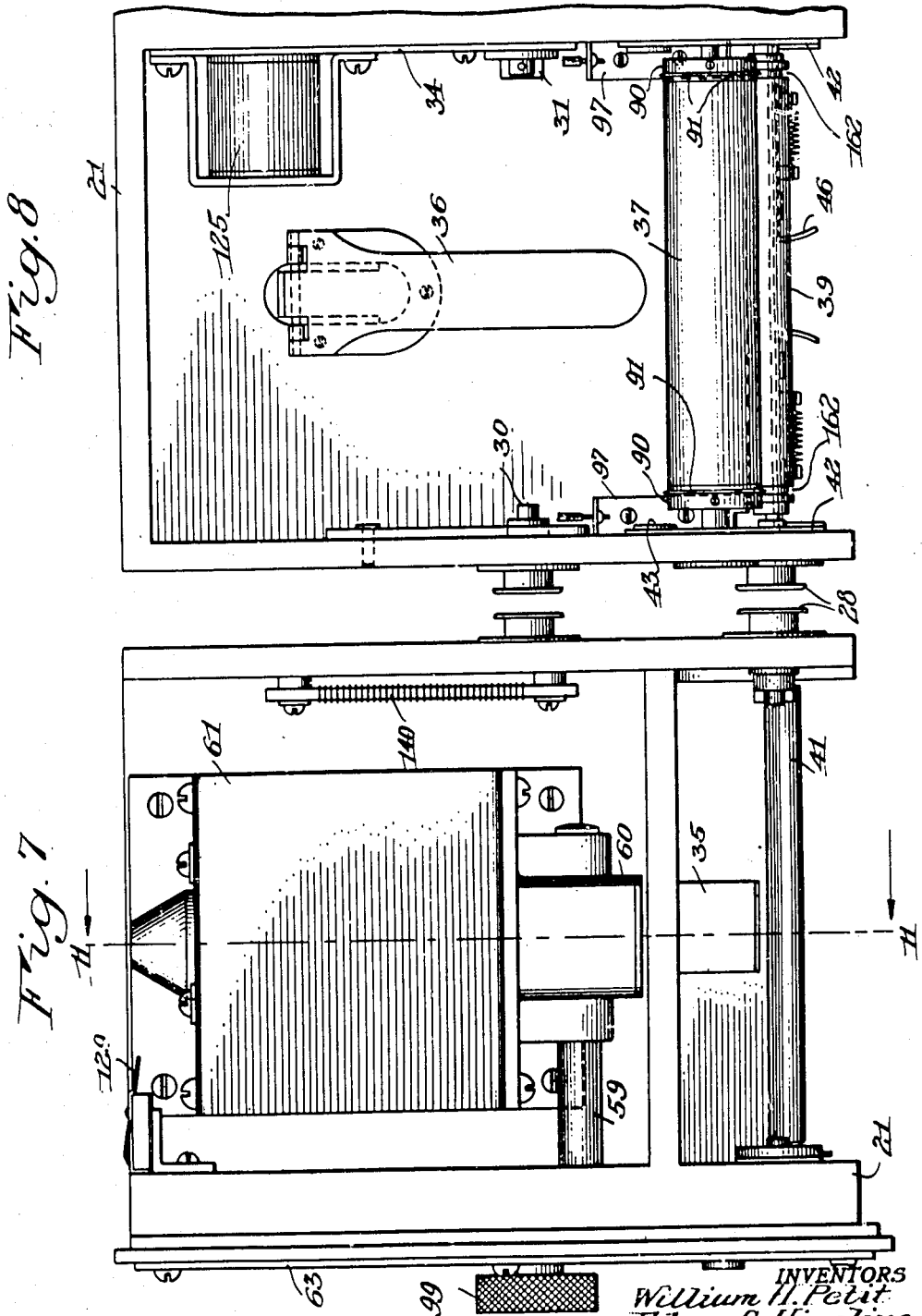

June 19, 1934.  W. H. PETIT ET AL  1,963,095
AUTOMATIC FILM CAMERA
Filed Jan. 15, 1932  10 Sheets-Sheet 4

June 19, 1934.                W. H. PETIT ET AL                1,963,095
                              AUTOMATIC FILM CAMERA
                          Filed Jan. 15, 1932          10 Sheets-Sheet 5
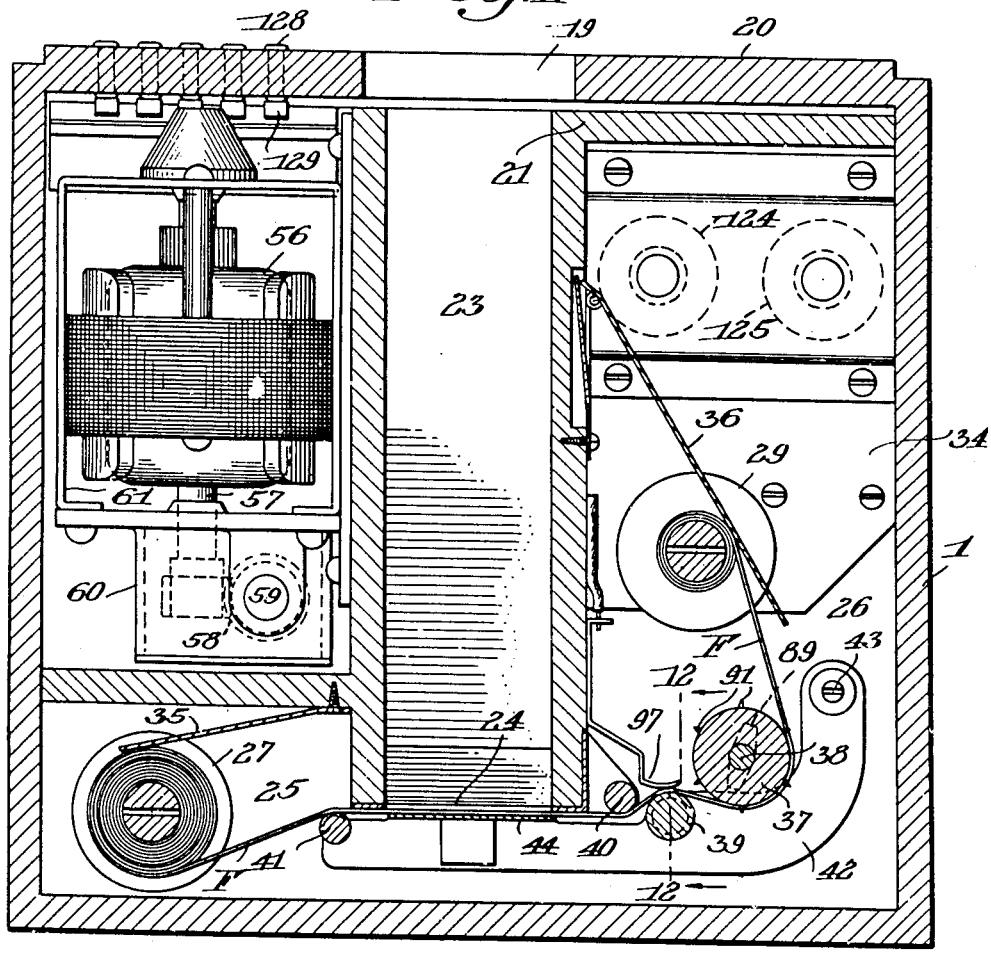
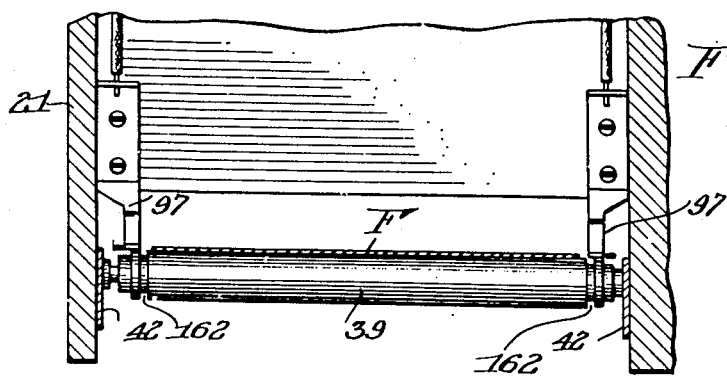
INVENTORS
William H. Petit
Edson S. Hineline
BY
their ATTORNEY

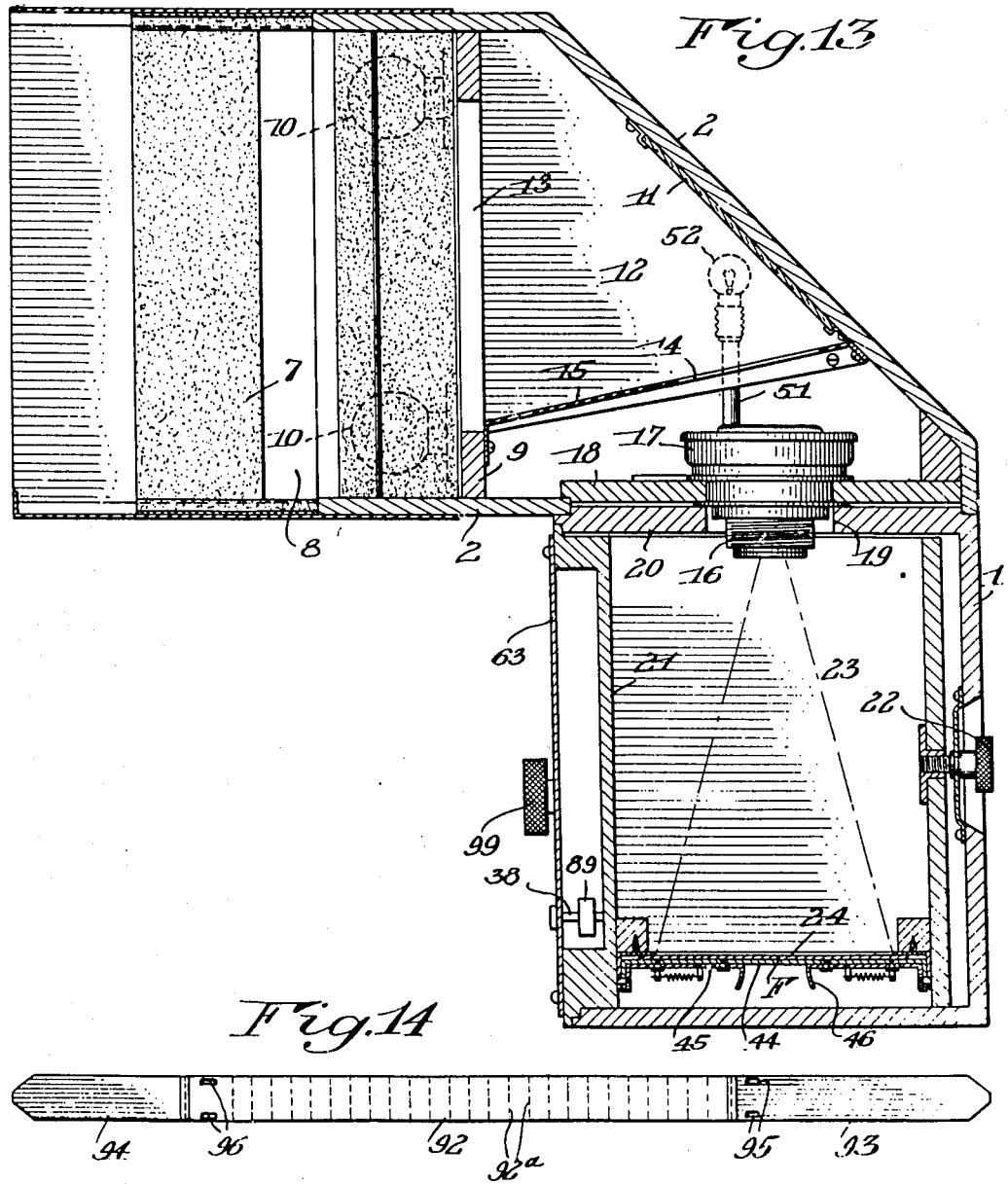

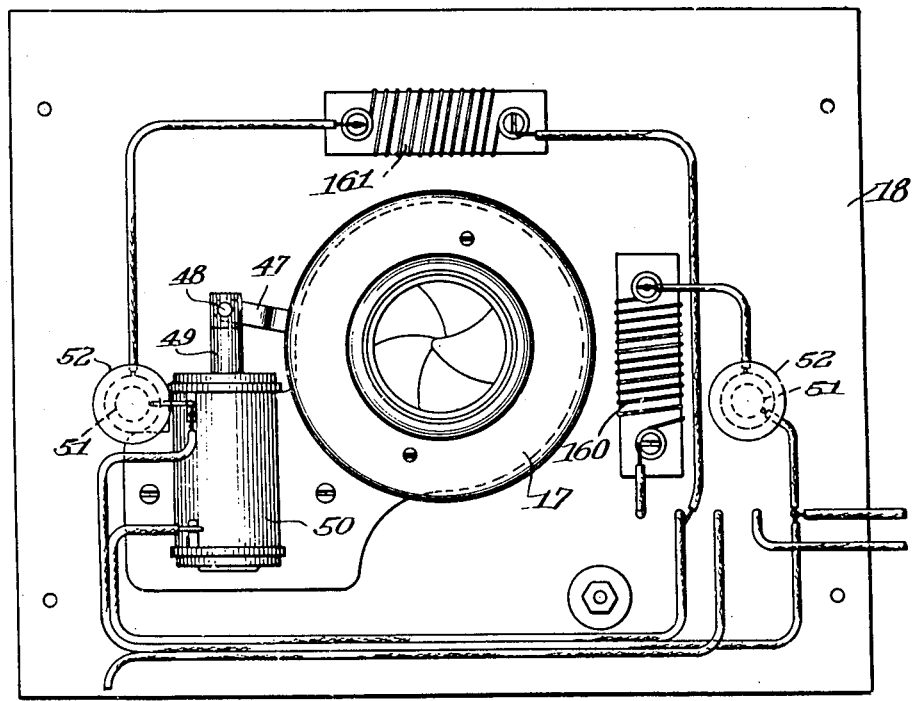
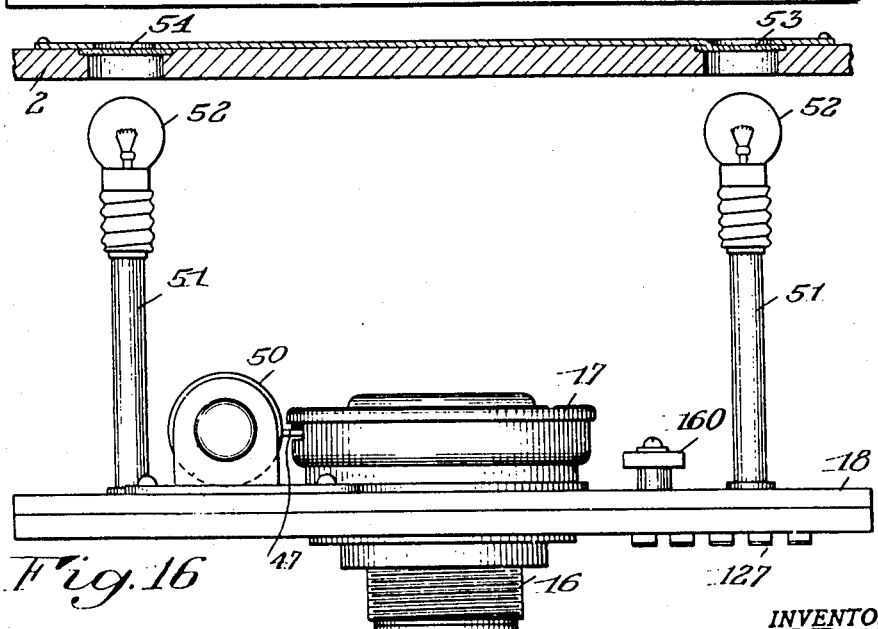

June 19, 1934. W. H. PETIT ET AL 1,963,095
AUTOMATIC FILM CAMERA
Filed Jan. 15, 1932 10 Sheets-Sheet 8

INVENTORS
William H. Petit
BY Edson S. Hineline
Their ATTORNEY

June 19, 1934.  W. H. PETIT ET AL  1,963,095
AUTOMATIC FILM CAMERA
Filed Jan. 15, 1932    10 Sheets-Sheet 9
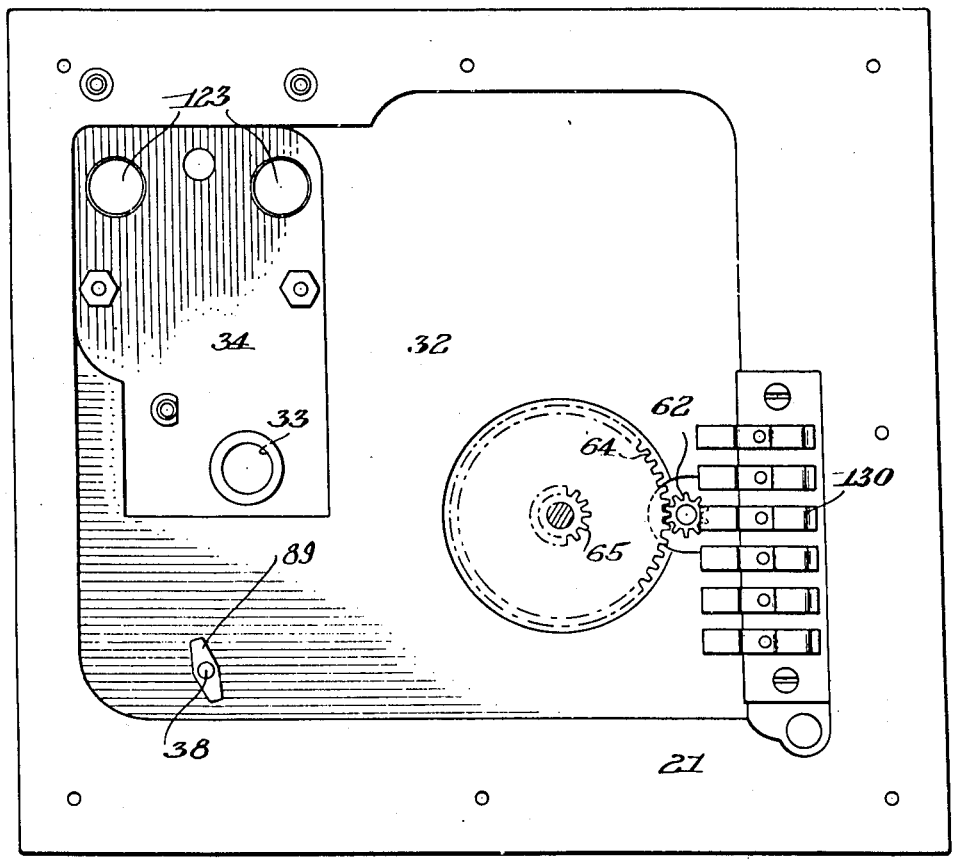
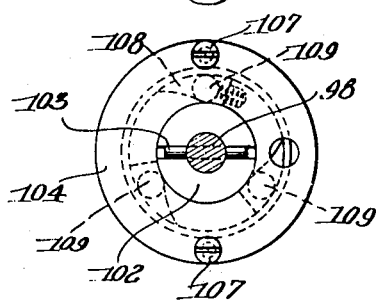
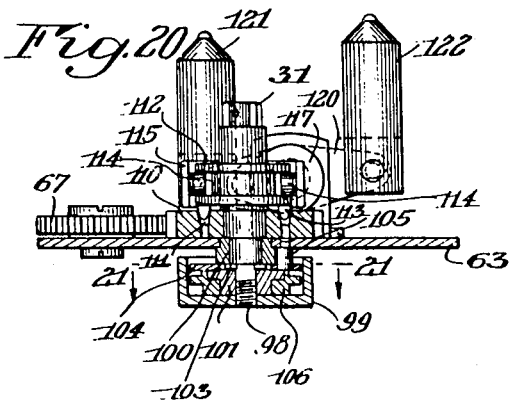
INVENTORS
William H. Petit
Edson S. Hineline
BY
their ATTORNEY

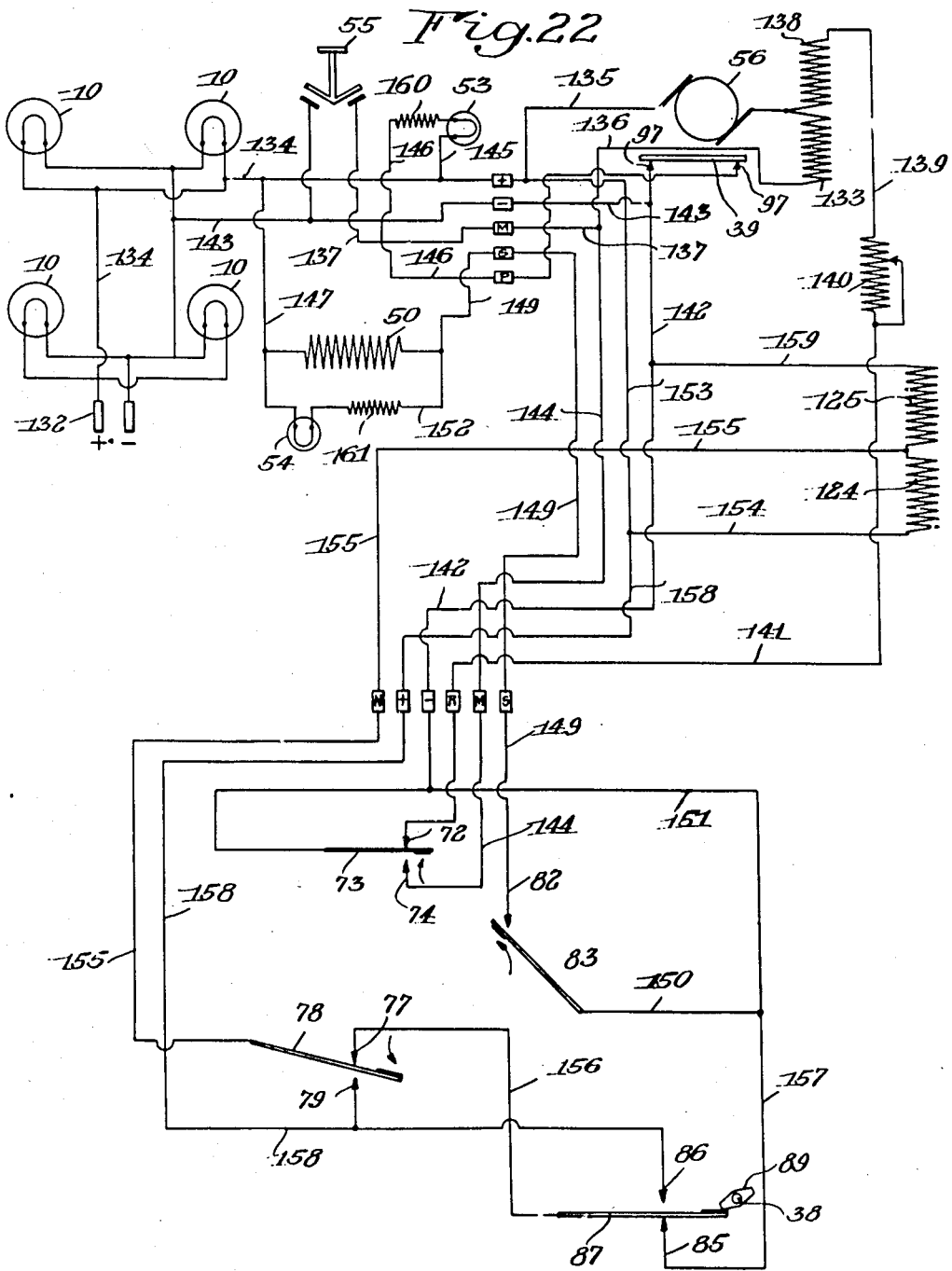

Patented June 19, 1934

1,963,095

UNITED STATES PATENT OFFICE 1,963,095

AUTOMATIC FILM CAMERA

William H. Petit and Edson S. Hineline, Rochester, N. Y., assignors to The Folmer Graflex Corporation, Rochester, N. Y., a corporation of Delaware Application January 15, 1932, Serial No. 586,919

46 Claims. (Cl. 95—31)

Our present invention relates to photography and more particularly to photographic cameras, and it has for its general object to provide an efficient, compact and conveniently operable camera of the automatic type, in which will be properly synchronized the winding or feeding of the film with the exposures of successive picture areas thereof in a manner precluding the possibility of a double exposure upon any one area, while at the same time arranging for successive exposures to be made with great rapidity one after another, the operator being at all times informed as to the condition of the working parts of his camera. A further general object of the invention is to produce such a camera equipped for electrical operation and control, in such a manner furnishing specific functions of a nature that increase the efficiency of the camera as compared with a mechanically operated mechanism of the same sort.

The improvements are directed in part toward eliminating as far as possible natural mistakes incident to manual control; toward reducing the manual effort required in operation; toward simplifying the loading and unloading of the film; toward gaining precision in the spacing of the exposure areas upon the film with a consequent prevention of waste in the film length; toward providing an improved control of the timing of the exposure; and toward effecting such of these results as are produced through electrical means or actuations practically independently of variations in the voltage of the electric current with which the camera is supplied.

To these and other ends, the invention resides in certain improvements and combinations of parts, all as will be hereinafter more fully described, the novel features being pointed out in the claims at the end of the specification.

In the drawings:

Fig. 1 is a side elevation of a hand camera constructed in accordance with and illustrating one embodiment of our invention;

Fig. 2 is a rear elevation thereof;

Fig. 3 is a front elevation;

Fig. 4 is a bottom plan view of the upper hood section.

Fig. 5 is a top plan view of the body or magazine box, upon which the hood of Fig. 4 rests;

Fig. 6 is a top plan view of the magazine withdrawn from the box;

Fig. 7 is a side view of the magazine, showing the driving motor in elevation and taken from the direction of the arrow marked 7 in Fig. 6;

Fig. 8 is a fragmentary view of the opposite side of the magazine taken from the direction of the arrow marked 8 in Fig. 6, both Figs. 7 and 8 being enlarged;

Fig. 11 is a further enlarged vertical section through the magazine taken on the line 11—11 of Fig. 7 and looking in the direction of the arrows;

Fig. 12 is a detailed fragmentary section taken on the line 12—12 of Fig. 11, showing a film guide roll controlling certain electrical connections;

Fig. 13 is an enlarged vertical section taken on the line 13—13 of Fig. 2;

Fig. 14 is a plan view of the film strip;

Fig. 15 is an enlarged top plan view of the bottom or floor of the hood or superstructure of the camera;

Fig. 16 is an edge view of the same taken from the rear and showing in fragmentary section a portion of the rear wall of the hood with which its function is related;

Fig. 19 is an elevation of the outer wall of the magazine, against which the mounting plate of Fig. 17 fits;

Fig. 20 is a detailed section of a clutch mechanism, as shown generally in section in Fig. 18 but with the parts in other positions;

Fig. 21 is an enlarged section on the line 21—21 of Fig. 20 looking in the direction of the arrows, and Fig. 22 is a diagram of the general circuit arrangements.

Similar reference numerals throughout the several views indicate the same parts.

Figure 9:
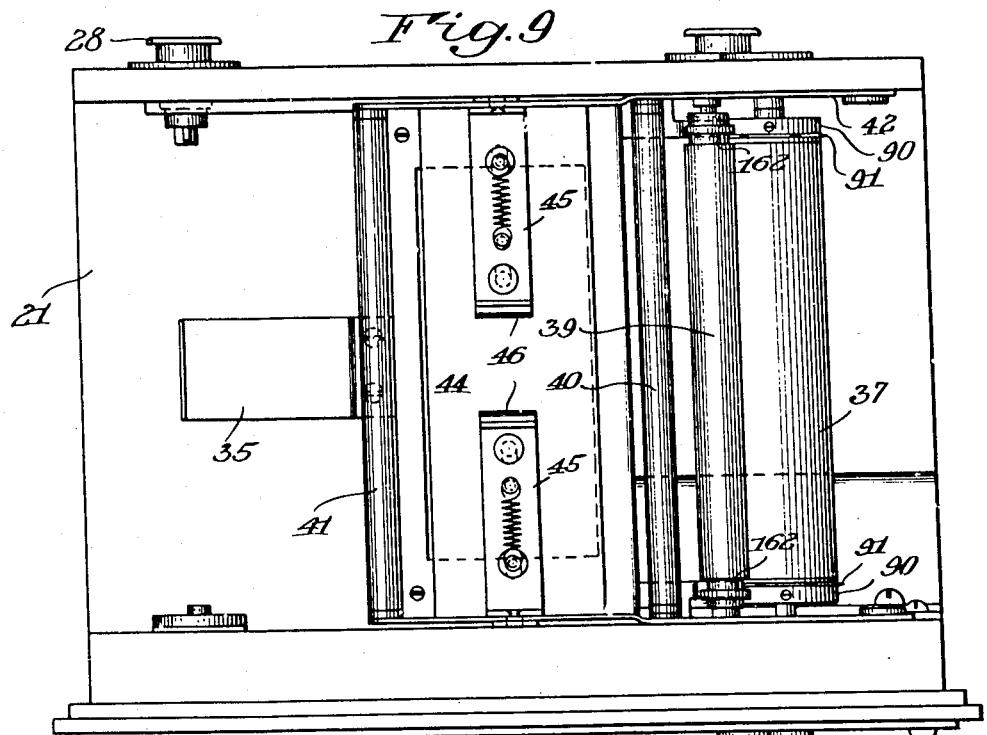
Fig. 9 is a bottom plan view of the magazine on the scale of Figs. 7 and 8 with the parts in operative position but without the presence of a film.

We will first give a general idea of the objects, functions or manner of use and the major elements of construction of the particular camera that we have illustrated herein before going into detail with respect to the particular instrumentalities utilized to accommplish the results.

The camera disclosed in the present application is adapted to many uses. Without attempting to enumerate the uses, and without in any way limiting the scope of the invention, we will more particularly refer to one important use thereof, which is the making of photographic records of the readings of meters in telephone exchanges. It is electrically operated, being suitably connected at a proper voltage with an available source of electrical energy, as, for example, an electric storage battery associated with all telephone exchanges. It carries its own illumination for the object, that is, the meter dials, in the way of suitable lamps that are preferably continuously lighted while the camera is hooked up to the circuit by means of a flexible cord that permits the operator to carry it from meter to meter. The film is loaded into the camera and then advanced until a white signal light flashes on and off. This signal indicates that the film is in position for subsequent exposures. The operator then simply holds the camera to the meter and presses an operating button controlling a contained motor driving a cycle member. The latter first opens and closes a shutter that makes a proper exposure upon one picture area of the film strip. The operator is informed by the illumination of a red signal light visible at the rear of the camera of the duration of this exposure, so that he will not remove the camera from its position against the meter until the shutter is closed again.

Without further manual effort, the cycle member then automatically attends to a winding movement of the film, whereby a new picture area is presented in the field of exposure. This winding occurs very rapidly and is ordinarily accomplished while the camera is being moved from one object or meter to the next. When the picture receiving area of the film has been completely wound off the white signal light is again illuminated, advising the operator of this condition. The sequences of exposure, winding of the film and subsequent exposure being so automatically accomplished, there is no danger of, nor opportunity for, double exposure, and should the operator present the camera to the new object before the winding of the film is completed, he still has to wait, after this next operation of the button, for the red shutter light to go on and off before he can properly remove the camera.

Referring more particularly to the drawings, the general preferred form of the camera is best shown in Figs. 1, 2 and 3. It comprises a lower box-like body 1, upon which rests or, in another way, which is suspended from a superstructure consisting of a hood 2 provided with lateral handles 3 so arranged that the camera as a whole is balanced in the operator's hands as he carries it about or presents it to the meter. These major parts are detachably connected together by means of bolts 4 at the sides of a type well known in the photographic art in conjunction with plates 5 provided with eyes 6 for a neck strap, if desired.

Fitted to the front of the hood is a central extension 7 of a configuration adapting it to set close against and surround the meter dial or register. There are lateral openings 8 at the rear of this extension adjacent to two lateral lamp chambers 9 containing electric lamps 10, which, as before stated and later explained, are constantly illuminated while the camera is in use. The interior walls of the extension 7 are whitened or otherwise rendered reflecting, so that the scattered rays of light from the lamps will carry to the object.

On the rear inclined wall of the hood 2 is arranged a mirror 11 (Fig. 13) within a chamber 12 having an opening 13 at the front through which the image reaches the mirror. Such image is cast downwardly through an opening 14 in the bottom wall 15 of the chamber to a lens tube 16 provided with a shutter, indicated generally at 17. This lens tube and shutter are carried on a removable panel 18 constituting the bottom of the hood 2, and the tube projects through a suitable central opening 19 in the top wall 20 of the body box 1.

Fitting within the said body box 1 and slidably removable therefrom at the front is an inner box-like magazine 21, shown removed and in top plan view in Fig. 6, which magazine carries the motor, film mechanism and operating gear hereinafter described. It is held in place by the usual thumb screw 22 extending through and accessible from the exterior of the back of the camera box.

A central exposure chamber 23 in the magazine aligns itself vertically with the lens tube 16 that receives the image from the mirror 11 and projects it downwardly to an exposure opening 24 at the bottom (see also Fig. 11). At the left side of the camera, the magazine, in conjunction with the box 1, forms a film feed chamber 25, and at the right side (both as viewed from the rear) a film winding chamber 26. The take-off spool or cartridge 27 of sensitive film is suitably mounted in the usual way on trunnions or centers 28 in the first mentioned chamber, and the take-up spool 29 is similarly mounted in the latter chamber on a center 30 and the usual winding key 31 interlocking with the slotted end of the spool, except that it is to be especially noted that the stem of this winding key hereinafter more particularly described extends through a cavity 32 routed out of the front side of the front wall of the magazine 21 and has a bearing 33 in a plate 34 secured to the inner side of such front wall. Both spools are respectively provided with the usual spring fingers 35 and 36 to exert a frictional tension thereon preventing overrunning.

Figure 10:
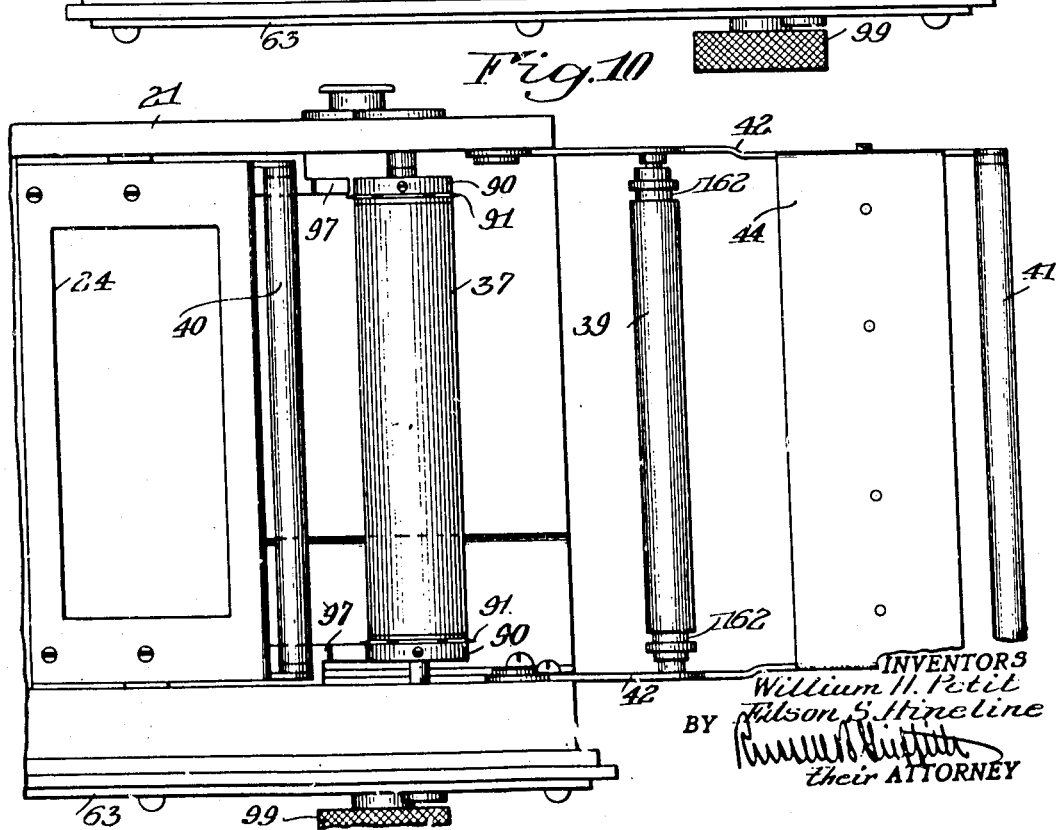
Fig. 10 is a similar fragmentary view with the film gate open, as in loading.

The film indicated at F passes laterally from spool 27, over a guide roll 41, across the exposure opening 24, under a guide roll 40, over an idler roll 39, around and under a supporting roll 37 turning freely, or which may be fixed, on a shaft 38 mounted in the magazine walls and thence to the winding spool 29. The idler 40 is fixed to the wall of the exposure chamber 23, but the idlers 39 and 41 are carried between yoke arms 42 pivoted at 43 and spanned by a transverse plate 44 backing up the rear of the film opposite to the exposure opening 24, and the whole constituting a gate that can be swung from the operative position of Figs. 9 and 11 to the inoperative position of Fig. 10 while loading the camera and threading the film, the magazine, of course, being removed from the box during this operation. The gate is held in place by sliding spring latches 45 on the plate 44, which are released by pinching together finger pieces 46.

Going back for a moment to the panel 18 on the floor of the hood element 2, on which the shutter 17 (Figs. 13, 15 and 16) has been described as being mounted, the usual operating lever 47 of this shutter is pivoted at 48 to the core 49 of a solenoid 50 mounted on the panel and wired in the manner hereinafter described to operate the shutter at the proper time. Also mounted on this panel at opposite sides of the shutter are two standards 51 carrying lamps 52.

These lamps project in proximity to two openings 53 and 54 in the rear wall of the hood element 2, the former of which is fitted, in the present instance, with a clear window and the latter with a ruby window to constitute respectively the film signal and the shutter signal first described. The one is wired in a manner hereinafter described to contact fingers normally contacting with an idler 39 over which the film passes, and the latter is wired to the shutter mechanism. Also on this rear signal wall is the main operating button 55 adjacent to one of the handles 3, so that it can be conveniently pressed by the thumb of the operator as he holds the camera before him.

Figure 17:
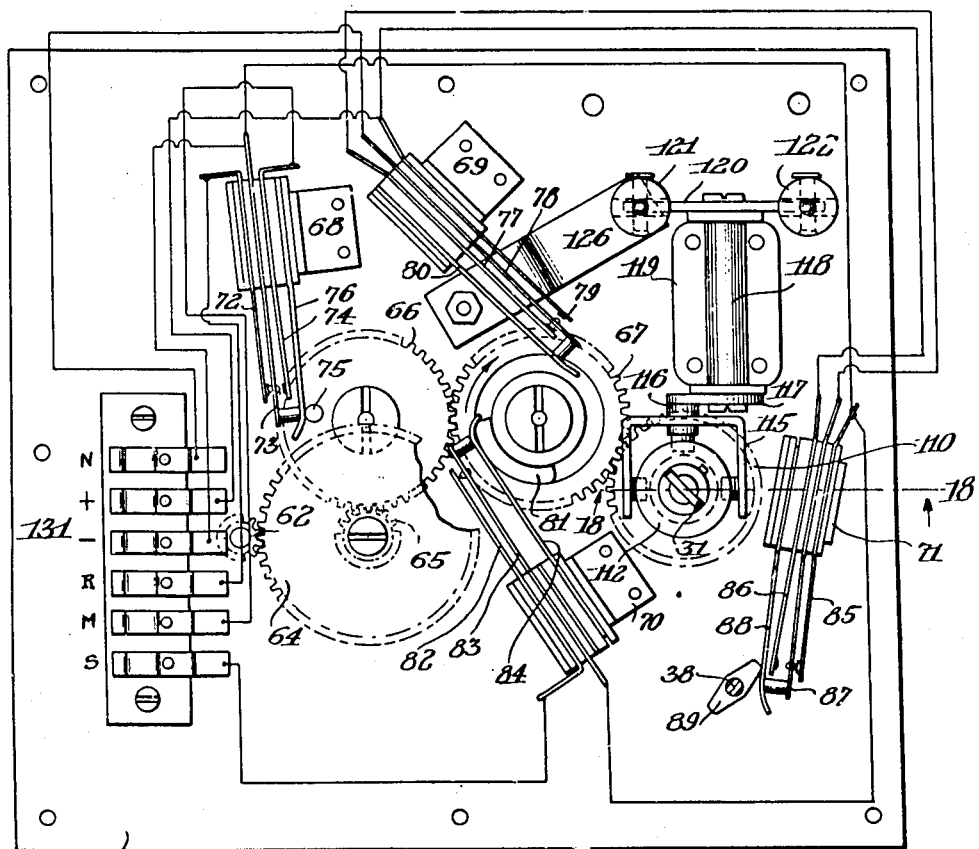
Fig. 17 is an elevation of the inner side of a mounting plate or an outer wall of the magazine carrying the electrical controlling mechanism, the circuits thereof being shown diagrammatically.

The prime mover for driving the camera consists of a motor, indicated generally at 56, best shown in Fig. 11 and located in the chamber above the film chamber 25 in the magazine 21. Its vertical shaft 57 communicates motion through worm gearing 58 to a shaft 59, all supported in a gear box 60 attached to the motor casing 61. This shaft extends forwardly and its end projects into the cavity 32 of the front wall of the magazine, where it terminates in a driving pinion 62 (Figs. 17 and 19).

The controlling mechanism is carried by a cover plate 63 fastened to the front wall of the magazine 21 and occupies the cavity 32. It embodies a master gear 64 driven by the said pinion 62 and itself carrying a pinion 65 driving a gear 66 meshing with a twin gear 67. This gearing, considered collectively, we term the cycle element or cycle mechanism because a cycle of movement thereof effects the successive operation of the camera parts in their proper order. Carried on the mounting plate are four insulated brackets 68, 69, 70 and 71, each carrying a set of contact members. The bracket 68 carries three contact fingers 72, 73 and 74 relating to the motor circuit. The center finger 73 is normally held closed, as in Fig. 17, by a pin 75 on gear 66 acting through a spring leaf 76 which, when released by the pin, moves said finger over to contact with finger 74.

Bracket 69 carries three contact fingers 77, 78 and 79 and similarly a spring leaf 80 on the bracket normally holds contacts 77 and 78 together, but the center finger 78 may be broken therewith and moved to contact 79 by a cam 81 on gear 67 engaging the spring leaf 80. Bracket 70 carries two contact fingers 82 and 83 normally held open by a spring actuator 84 but closed when the latter is suitably engaged by cam 81.

Bracket 71 carries two contact fingers 85 and 86 with an intermediate finger 87 held normally in contact with the latter by a spring actuator leaf 88. This leaf is actuated to reverse the contact to the other finger 85 by a cam 89 on film shaft 38, heretofore described.

These circuit arrangements will be later described with reference to the diagrammatic view of Fig. 22, but we will now describe first the physical features of this film control.

Fixed to such shaft 38 at opposite ends of the supporting roll 37, over which the center of the film passes, are two wheels 90 provided with spurs 91 in line with the margins of the film and adapted to be driven by the latter to rotate the shaft 38. The travel thereover of one picture area of the film operates the cam 89 on the shaft to shift and return the contacts 85, 86, 87. The film is prepared in the conformation shown in Fig. 14, where 92 indicates the intermediate film body, 93 the lead end of attached paper and 94 the inner or spool end of attached paper. The film is so constructed that at points 95 on the lead end 93 adjacent to the film and at points 96 at the rear end of the film body, respectively, it will not constitute an insulating medium such as does the rest of the strip with reference to certain electrical contacts about to be described. In the present instance, these elements are constituted by slots or openings adjacent to the margins but as will hereinafter appear, the same function could, in some instances, be performed by cutting away or narrowing the film. In the embodiment shown, the said narrowed portions 95 and 96 are in the form of slots cut parallel with the edges of the film and of lengths sufficient to rob those portions of the film of their insulating capacity for the desired period.

Associated with the film gate roll or idler 39 in alignment with the wheels 90 on the roll shaft 38 are two contact members 97, best shown in Fig. 12, so far as their physical characteristics are concerned. They are normally in contact with said roll, which forms an electrical connection between them in the absence of a film threaded through the magazine in the manner earlier described. They also pass into such contact when the cut-away portions 95 and 96 of the film are travelling across the roll 39, as in the figure referred to. It is through these contacts that the white signal light 53, indicating the position of the film, is established.

Figure 18:
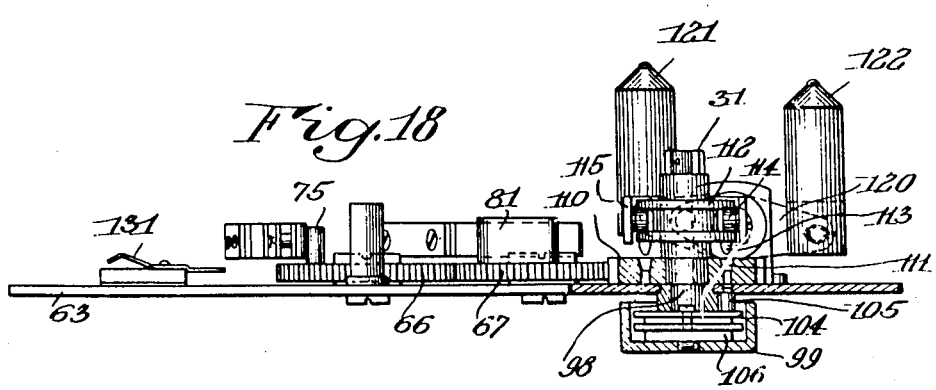
Fig. 18 is an edge view of such mounting plate taken partly in section on the line 18—18 of Fig. 17.

For convenience in winding the film by hand, as when initially threading it through the magazine, the stem 98 of the film winding key 31 extends through the mounting plate 63 (Figs. 17, 18 and 20) and has secured thereto at the exterior a knob 99. The usual overrunning clutch, shown in Fig. 21, to prevent reversal or backwind is provided in this connection to function also with respect to the motor drive hereinafter described. To this end, a reduced portion of the stem turns in a bushing 100 fixed to the mounting plate 63. A further reduced portion at the end of the stem carries an inner clutch member 101 provided with a hub 102 that is slotted to receive a pin 103 locking it to the stem. Surrounding this hub is a washer 104 that is pinned to mounting plate 63 at 105. An outer clutch member 106 is screwed at 107 to the washer 104 as a fixed element. Tapered cavities 108 in the periphery of the inner clutch member 101 contains spring pressed balls 109 that jam with the inner surface of the outer clutch member when it is attempted to reverse the key winding and lock the knob and stem in that direction while, on the other hand, they are unseated when the knob and stem are turned in a winding direction and the inner clutch member turns freely with them within the outer clutch member.

The motor drive for the winding key 31 is provided as follows:

Gear 67 of the cycle mechanism meshes with a gear 110 turning freely on the stem 98 of the winding key 31. This gear 110 is provided with openings 111 and constitutes the female element of a clutch, a male element 112 provided with pins 113, being splined on the stem 98 to slide axially into and out of engagement. The element 112 has a peripheral groove in which engage the pins 114 of a shipping yoke 115 carried on the wrist pin 116 of a crank arm 117. The crank arm is mounted on a vertical shaft 118 supported in a bracket 119 on the mounting plate 63. At its opposite or upper end, there is fixed to the shaft a rocking beam 120, to opposite ends of which are pivoted two solenoid cores 121 and 122. These project through openings 123 in plate 34 on the under side of the front wall of the magazine and into solenoid coils 124 and 125 secured to the inner side of said plate. It will be seen that when solenoid 125 is energized, the core 122 will be attracted and rock the shaft 118 to throw in the clutch elements 110 and 112 connecting the gearing with the winding key 31, whereas energizing solenoid 124 attracts core 121 and disengages the clutch. Inasmuch as the clutch is normally out, the film, of course, being wound only intermittently, and greater effort is required to disengage it than to engage it, we provide a leaf spring 126 on the plate 63 that presses on the beam 120 beneath core 121.

As the electrical circuits extend between all of the relatively detachable parts that have been described, it is impractical to connect them with continuous wires. We hence provide banks of terminal contacts on adjacent members which, when the members are associated, close the various circuits, but which permit the members to be disassociated at will. Thus, the group of contacts 127 on the bottom of the hood 2 cooperate with corresponding contacts 128 on the body 1, which in turn engage contacts 129 on the magazine 21 when it is slipped into place within the body. The group 129 are connected to a similar group 130 by wires not shown, and these contacts 130 cooperate with a group of contacts 131 on the mounting plate 63.

The camera is connected with a source of current, as first described, through a plug fixture 132 on the left side of the hood 2. The circuit arrangements and cycle of automatic operation will now be described with reference to the diagram of Fig. 22.

Referring to this diagram, it is too obvious for the use of further reference numerals that the object illuminating lamps 10 are connected in parallel with the line circuit and will be illuminated continuously while the apparatus is plugged in at 132. Besides the normal driving field 133, the motor 56 is provided with a field 138, which acts as a dynamic brake for restraining and promptly halting it. When the apparatus is plugged in to the line wire or source of electrical supply at 132, a current reduced in volume by the variable resistance 140 immediately flows through this field 138 through circuit plus 132, wires 134 and 135, motor 56, field 138, wire 139, resistance 140, wire 141, contact finger 72, contact finger 73, wire 142, wire 137 and back to the minus side of 132. Assuming that the lead end of the film 93 has been threaded through the gate and attached to the winding spool 29, the manual operating button 55 is pressed by the user, a circuit is established through field 133 of the motor and the latter set in motion through circuit plus 132, wires 134 and 135, motor 56, field 133, wires 136 and 137, button 55, wire 143 back to 132, and the gearing of Fig. 17 is set in motion.

As soon as the temporary circuit, through the switch button, has thus been established through the positive forward driving field of the motor, pin 75 on gear 66 releases finger 73 from contact 72 opening the reverse or brake field and establishes contact 72 in contact with finger 74, completing a working circuit through the motor during one rotation of the cycle gear 66, as follows: plus 132, wire 134, wire 135, motor 56, field 133, wire 136, wire 144, contact 74, contact 73, wire 142, wire 143 and back to minus 132.

Until the slotted portion 95 of the film strip lead 93 has passed over roll 37, the contacts 97 are not insulated from roll 39, as in Fig. 12, and during this period a circuit is closed through the white signal light 53 to warn the operator that a picture area is not yet in front of the exposure opening. This circuit is established through plus 132, wire 134, wire 145, lamp 53, wire 146, contacts 97, through roll 39, wire 143, and back to minus 132. When the film strip has progressed sufficiently to so present a picture area, it insulates the contacts 97 from roll 39 and the white light goes out.

The film strip is now in position for making exposures and the sensitive intermediate body 92 thereof is of sufficient length to provide, within reasonable mechanical bounds, any desired number of picture receiving areas 92ª, one succeeding the other, so that when the film is developed, the photographs of the meter readings or other objects will appear along its length in the order in which they were taken. When the extent of such sensitized body 92 has been exhausted in this way, the second cutaway portion or opening 96 at the end thereof next to the attached end 94 that is next to the winding spool in the initial threading of the film crosses the measuring roll 37. Because of the slots or cut-away portions at the edges of the film, the film uncovers the contact members 97, causing them to electrically contact with roller 39 and complete the circuit through the film signal white window 53, as illuminated by the adjacent bulb 52. The showing of this light at such time thus completes the effective passage of the film and indicates the same.

Spur wheels 90 are really tangent to roll 39 in practice, so that the spurs cooperate with grooves 162 therein to insure driving engagement of the film but to clarify the showing of the co-operation of the contacts 97 therewith also they have been shown moved back a ways in Fig. 11.

Until a film area is presented at the exposure opening, it is, of course, immaterial whether the shutter is operated or not, but once such presentation is made at the beginning of the succeeding cycle, cam 81 on the twin cycle gear 67 from its position in Fig. 17 flexes the actuator spring 84 to close the circuit between contact fingers 82—83 and operate the shutter as follows: plus 132, wire 134, wire 147, solenoid 50, wire 149, contact 82, contact 83, wires 150, 151, 142, 143 back to minus 132. At the same time, a parallel circuit is established from wires 149 and 147 through a wire 152 and red lamp signal 54, which latter is illuminated while the shutter is open and so held by solenoid 50 acting upon shutter operating lever 47.

After cam 81 has left actuator 84, opening the shutter circuit again at 82—83, it next engages actuator 80 to shift contact finger 78 from contact finger 77 to contact finger 79. While 78 has been theretofore closed with 77, a circuit has been maintained through solenoid 124 acting on core 121 to hold the winding clutch member 112 in disengaged position, this circuit being as follows: plus 132, wire 134, wires 153 and 154, solenoid 124, wire 155, contact 78, contact 77, wire 156, contact finger 87 on the film winding control, contact 85, wires 157 and 151, wires 142 and 143 back to minus 132. When contact finger 78 is so shifted to contact finger 79, the other solenoid 125 operating upon core 122 to throw the clutch in is energized through the following circuit: plus 132, wires 134, 153 and 158, contact 79, contact 78, wire 155, solenoid 125, wire 159 and wires 142 and 143 back to 132 minus.

Such clutch engaging circuit is, of course, maintained in this way as long as cam 81 rides on finger 80, and it would at first appear that the movement into exposing position of a picture area of the film could be controlled by the length of this cam 81. But because the winding roll is steadily increasing in diameter, due to the accumulation of exposed film thereon, and hence increases the rate of feed with each revolution, such a provision cannot be depended upon, and hence we control the clutch circuit just described by means of the cam 89 on the measuring roll shaft 38. This operates in the following manner:

We have so far described it in its normal position of Figs. 17 and 22, in which it closes the clutch retracting solenoid circuit. When the film starts to move with the clutch engaging contact at 78—79, it slips off of contact finger 87 and allows the latter to establish contact at 86 during the rotation of the wheels and the accurate measuring of the film. Thus, it is immaterial, when the cam 81 leaves contact with finger 78 to open the circuit at 79, because this circuit is maintained through wire 156, as follows: Instead of travelling from contact 78 through contact 79 to wire 158, it travels through contact 77, wire 156, contact 87 and contact 86 back to wire 158 and so on. As soon as the measuring is completed through one revolution of the measuring wheels, the cam 89 breaks the clutch engaging solenoid circuit at 86, already broken at 79, and the clutch retracting solenoid circuit is reestablished, as before.

The resistance coils for the signal lamps 53, indicated at 160 and 161, are provided merely to admit the use of low voltage filaments. The variable resistance 140 to motor field 138 is adjusted so as to limit the current through the motor when used for braking, to keep the reversing torque just below the volume required to start the motor under normal voltage conditions. On voltages above normal, the braking torque may be sufficient to cause the motor to reverse, but this action takes place only until the pin 75 has moved sufficiently far to allow the contact between contact fingers 72 and 73 to be broken when the circuit is completely open.

A feature of the electrical arrangements of our apparatus resides in the fact that the illumination of the object and the duration of the exposure through the shutter are automatically correlated, because if the voltage is low, the illumination by the lamps 10 will be less intense, but the action of the motor will be correspondingly affected and the speed of the shutter actuating means correspondingly slowed up, while the reverse would be true in the latter action when the voltage is increased and a more intense light is furnished by the lamps. To this end, the operating motor is so wound that a slight change in voltage will be reflected in an increase or decrease in the speed thereof, which is a characteristic usually to be avoided in the construction of motors but highly acceptable to the purposes herein involved. Of course, the average voltage under which the motor is expected to operate is coordinated with the length of the cam 81, which cam in greater or lesser length can be interchanged to meet particular conditions.

It will be seen that, in accordance with the broad scope and purpose of our invention, we utilize the film strip to control signalling means, to indicate the appearance at the exposure opening of the sensitized surface of the film, and also to indicate the disappearance of the sensitized surface from said exposure opening. Desirably that signalling means is the flashing of a light which, in the disclosed embodiment of the invention, flashes when the leading end of the sensitized surface appears at the exposure opening and when the opposite end of said sensitized surface disappears from or is delivered past said opening. Further, in accordance with our invention, we provide signalling means to indicate the operation of the shutter mechanism (that is, the opening and the closing thereof).

Other claims, relating to a method of controlling the functions of an automatic or partially automatic camera, are contained in our co-pending application Ser. No. 723,524, filed May 2, 1934. Also a portion of the subject matter disclosed but not claimed herein is claimed in our divisional application Ser. No. 699,324, filed November 23, 1933, and related subject matter is also claimed in our co-pending application Ser. No. 715,107, filed March 12, 1934.

We claim as our invention:

1. In a photographic camera, the combination with a body box, of a hood provided with a taking opening at the front detachably secured on top of the box, said hood having means therein for illuminating the object electrically and having means for connecting to a circuit at the place of use, an inclined mirror at the rear of the hood, an electric motor within the body box, and means for spreading film for exposure at the bottom of the box and detachable electric contacts on meeting faces of the body box and hood respectively, permitting ready detachment of said members.

2. In a photographic camera, the combination with a body box, of a hood provided with a taking opening at the front detachably secured on top of the box, said hood having means therein for illuminating the object electrically and having means for connecting to a circuit at the place of use, an inclined mirror at the rear of the hood, a lens tube and shutter on the bottom of the hood, an electric motor within the body box, and means for spreading film for exposure at the bottom of the box and detachable electric contacts on meeting faces of the body box and hood respectively, permitting ready detachment of said members.

3. In a photographic camera, the combination with a body box, of a hood provided with a taking opening at the front detachably secured on top of the box, said hood having means therein for illuminating the object electrically and having means for connecting to a circuit at the place of use, an inclined mirror at the rear of the hood, a detachable panel forming a bottom for the hood cooperating with the box, a lens tube and shutter carried by the panel, and motor means for spreading film for exposure at the bottom of the box, said motor means being positioned in the body box, and detachable connections between said body box and said hood, whereby the motor means may be operated through the hood.

4. In a photographic camera, the combination with a body box, of a hood provided with a taking opening at the front detachably secured on top of the box, an inclined mirror at the rear of the hood, means for spreading film for exposure at the bottom of the box, a lens tube and shutter mounted in the bottom of the hood, electrical means for operating the shutter, and an electric signal on the hood connected with said operating means for indicating the position of the shutter.

5. In a photographic camera, the combination with a body box, of a hood provided with a taking opening at the front detachably secured on top of the box, an inclined mirror at the rear of the hood, electrical means for spreading film for exposure at the bottom of the box, and an electric signal on the hood connected with said operating means for indicating the position of the film.

6. In a photographic camera, the combination with a body box, of a hood provided with a taking opening at the front detachably secured on top of the box, an inclined mirror at the rear of the hood, electrical means for spreading film for exposure at the bottom of the box, an electric signal on the hood connected with said operating means for indicating the position of the film, a lens tube and shutter on the bottom of the hood, electrical means for operating the shutter, and an electrical signal on the hood connected with the shutter operating means for indicating the position of the shutter.

7. In a photographic camera, the combination with a body box, of a hood provided with a taking opening at the front and a signal opening at the rear, said hood being detachably secured on top of the box, an inclined mirror at the rear of the hood, means for spreading film for exposure at the bottom of the box, a lens tube and shutter mounted in the hood, electrical means for operating the shutter, and a lamp within the hood adjacent to the signal opening and connected with said operating means for indicating the position of the shutter.

8. In a photographic camera, the combination with a body box, of a hood provided with a taking opening at the front and a signal opening at the rear, said hood being detachably secured on top of the box, an inclined mirror at the rear of the hood, electrical means for spreading film for exposure at the bottom of the box, and a lamp within the hood adjacent to the signal opening and connected with said operating means for indicating the position of the film.

9. In a photographic camera, the combination with a body box, of a hood provided with a taking opening at the front, said hood being detachably secured on top of the box, electrical means for spreading film for exposure at the bottom of the box, means including a lens and shutter in the hood for projecting an image downwardly upon the film, electrical means within the hood for operating the shutter, controlling means within the box for both electrical means, and contacts on the hood and box, respectively, brought into cooperation by the assembly of these two members for establishing the necessary electrical circuits.

10. In a photographic camera, the combination with a body box and a hood provided with a taking opening at the front and detachably mounted on top of said box, of a detachable magazine slidably engaging within the box, electrical means carried by the magazine for spreading film for exposure at the bottom of the box, means including a lens and shutter in the hood for projecting an image downwardly upon the film, electrical means within the hood for operating the shutter, controlling means within the magazine for both electrical means aforesaid, and contacts on the hood, the box and the magazine, respectively, brought into cooperation by the assembly of these three members for establishing the necessary electrical circuits.

11. In a photographic camera, the combination with a body box and a detachable magazine fitting therein, the outer wall of the latter being provided with a cavity, of electrical film exposing devices, including a motor carried by the magazine, and a detachable mounting plate secured to said wall and carrying controlling mechanism for the exposing devices and the motor.

12. In a photographic camera, the combination with a film support embodying an exposure opening, of means for drawing film past the latter embodying a winding roll, a motor, a clutch connection between the latter and the winding roll, means for actuating the clutch to in and out positions, a pair of solenoids connected to oppositely affect the actuating means, and controlling means for the motor and solenoids.

13. In a photographic camera, the combination with a film support embodying an exposure opening, of means for drawing film past the latter embodying a winding roll, a motor, a clutch connection between the latter and the winding roll, means for actuating the clutch to in and out positions, a pair of solenoids connected to oppositely affect the actuating means, and controlling means for the motor and solenoids including a normally closed circuit for that solenoid which effects the retraction of the clutch.

14. In a photographic camera, the combination with a film support embodying an exposure opening, of means for drawing film past the latter embodying a winding roll, a motor, a clutch connection between the latter and the winding roll, means for actuating the clutch to in and out positions, a pair of solenoids connected to oppositely affect the actuating means, a measuring roll for the film driven by the latter, and an actuator on the measuring roll controlling the solenoid circuits.

15. In a photographic camera, the combination with a film support embodying an exposure opening, of means for drawing film past the latter embodying a winding roll, a motor, a clutch connection between the latter and the winding roll, means including an electric circuit for operating the clutch, a measuring roll for the film driven thereby, and an actuator on the measuring roll controlling the circuit of the said operating means.

16. In a photographic camera, the combination with a film support embodying an exposure opening, of means for drawing film past the latter embodying a winding roll, a motor, a clutch connection between the latter and the winding roll, means including an electric circuit for operating the clutch, means for initially establishing said circuit temporarily, a measuring roll for the film driven thereby, and an actuator on the measuring roll for continuing a circuit through the clutch operating means and then breaking the same.

17. In a photographic camera, the combination with a film support embodying an exposure opening, of means for drawing film past the latter embodying a winding roll, a motor, a clutch connection between the latter and the winding roll, means including an electric circuit for operating the clutch, a switch in the motor circuit, a cycle member driven by the motor and maintaining said switch closed during its cycle, manually operable means for establishing a temporary circuit through the motor, means operated by the cycle member for initially establishing the clutch control circuit temporarily, a measuring roll for the film driven thereby, and an actuator on the measuring roll for continuing a circuit through the clutch operating means and then breaking the same.

18. In a photographic camera having a taking opening at the front thereof, the combination with an electric lamp for illuminating the object arranged adjacent to the opening, of a film support and a shutter for exposing film therein, electrical means including an electric circuit for operating the shutter, a source of electric energy connected to the lamp circuit and to the circuit of the shutter operating means, a motor, a cycle member driven thereby, the motor being connected to the same source of electric energy, a switch in the circuit of the shutter operating member, and an actuating device on the cycle member arranged to dwell upon the switch when closing the same.

19. In a photographic camera, the combination with a body having an unexposed film support embodying an exposure opening and means for drawing unexposed film past the latter, of an electric signal having a circuit including contact members associated with a metallic element of the film support but adapted to be insulated therefrom by portions of an unexposed film in the support.

20. In a photographic camera, the combination with a body having an unexposed film support embodying an exposure opening and means for drawing unexposed film past the latter, of an electric signal having a circuit including contact members associated with a metallic element of the film support in alignment with and adapted to be insulated by the edges of a film strip, and a film strip in the support having cut-away portions in its edges to allow the circuit to close through the contacts at a predetermined point in the progress of its feed.

21. In a photographic camera, the combination with a body having a sensitized film support embodying an exposure opening and means for drawing film past the latter, of an electric signal having a circuit including contact members associated with a metallic element of the film support in alignment with and adapted to be insulated by the edges of a film strip, and a film strip in the support embodying a spool attaching lead end, an inner spool attaching end and an intermediate sensitized body surface, the lead end adjacent to the latter and the film body adjacent to the other attaching end being cut away at its edges to allow the circuit to close through the contacts at predetermined points in the progress of the film and to be at other times insulated by the margins of the film.

22. In a photographic camera, the combination with a body having an unexposed film support embodying an exposure opening, a metallic guide roll adjacent thereto and means for drawing film over the roll and past the opening, of an electric signal having a circuit including contact members normally engaging the roll but adapted to be insulated therefrom by the passage of the film body.

23. In a photographic camera having an exposure opening and adapted to receive a removable sensitized film to be intermittently exposed at said opening, electrically operated means for intermittently feeding said film past said exposure opening, and signalling means operated by said film to indicate the carrying out of a step or act in the photographic process.

24. In a photographic camera having an exposure opening and adapted to receive a removable sensitized film to be intermittently exposed at said opening, electrically operated means for intermittently feeding said film past said exposure opening, and two signalling means to indicate the carrying out of different steps or acts in the photographic process, at least one of said signalling means being operated by said film.

25. In a photographic camera having an exposure opening and adapted to receive a removable sensitized film to be intermittently exposed at said opening, electrically operated means for intermittently feeding said film past said exposure opening, and two signalling means to indicate respectively the presence of a sensitized area at said opening and the effecting of a single exposure.

26. In a photographic camera having an exposure opening and adapted to receive a removable sensitized film to be intermittently exposed at said opening, electrically operated means for intermittently feeding said film past said exposure opening, and two signalling means to indicate respectively the presence of a sensitized area at said opening and the effecting of a single exposure, at least one of said signalling means being operated by said film.

27. In a photographic camera having an exposure opening and adapted to receive a removable sensitized film to be intermittently exposed at said opening, electrically operated means for intermittently feeding said film past said exposure opening, and signalling means operating by said film to indicate the presence of a sensitive area at said opening and also to indicate the passage of said sensitive area beyond said opening.

28. In a photographic camera having an exposure opening and adapted to receive a removable sensitized film to be intermittently exposed at said opening, electrically operated means for intermittently feeding said film past said exposure opening, and two signalling means to indicate respectively the accomplishment of an exposure and the presence of the exposed area at said exposure opening, the latter being operated by said film.

29. In a photographic camera having an exposure opening and a sensitized film to be intermittently exposed at said opening, electrically operated means for intermittently feeding said film past said exposure opening, and two visual signals to indicate the carrying out of two different acts or steps in the photographic cycle or process.

30. In a photographic camera having an exposure opening and a sensitized film to be intermittently exposed at said opening, electrically operated means for intermittently feeding said film past said exposure opening, and two visual signals to indicate the carrying out of two different acts or steps in the photographic cycle or process, one at least of said signals being operated by the said film.

31. In a photographic camera having an exposure opening and a sensitized film to be intermittently exposed at said opening, automatic means for intermittently feeding said film past said exposure opening, and signalling means operated by said film to indicate the accomplishment of a step in the photographic cycle.

32. In a photographic camera having an exposure opening and a sensitized film to be intermittently exposed at said opening, means for intermittently feeding said film past said exposure opening, and two signalling means to indicate the accomplishment of two different steps in the photographic cycle.

33. In a photographic camera having an exposure opening and a sensitized film to be intermittently exposed at said opening, means for intermittently feeding said film past said exposure opening, and two signalling means to indicate the accomplishment of two different steps in the photographic cycle, one of said signalling means being operated by said film.

34. In a photographic camera having an exposure opening and a sensitized film to be intermittently exposed at said opening, automatic means for intermittently feeding said film past said exposure opening, and signalling means to indicate the accomplishment of the exposure of one field of said sensitive surface of the film.

35. In a photographic camera having an exposure opening and a sensitized film to be intermittently exposed at said opening, motor means for intermittently feeding said film past said exposure opening, and signalling means operated by said film to indicate the completion of the feeding of the sensitized surface of said film past the exposure opening.

36. In a photographic camera having an exposure opening and a sensitized film to be intermittently exposed at said opening, means for intermittently feeding said film past said exposure opening, and distinct signalling means to indicate respectively the exposure of an area of said film and the removal of the entire sensitized area from the exposure opening, at least one of said signalling means being operated by the said film.

37. In a photographic camera having an exposure opening and a sensitized film to be intermittently exposed at said opening, motor means for effecting successive exposure and the feeding of said film step-by-step past said opening, and means whereby said film acts to indicate the presence of a sensitized surface at the exposure opening.

38. In a photographic camera having an exposure opening and a sensitized film to be intermittently exposed at said opening, a cycle member controlling the feeding of the strip and the opening and closing of the shutter, and motor means to operate said cycle member and to vary the time the shutter is open.

39. In an electrically operated photographic camera, the combination with a sensitized film support having electrical contacts normally closing a circuit performing a function for which the camera is designed, and adapted to receive a film strip having a conformation operating to successively open and close the circuit through said contacts as the strip passes through the film support.

40. In an electrically operated photographic camera, the combination with a signalling device, of a sensitized film support having electrical contacts normally closing a circuit through such signalling device, and adapted to receive a film strip having a conformation operating to successively open and close the circuit through said contacts as the strip passes through the film support.

41. In a photographic camera, the combination with the body box thereof, of a hood constituting a part of said camera and provided with a taking opening at the front, said hood being positioned at the top of said body box, an inclined mirror at the rear of the hood, means for spreading a film for exposure at the bottom of the body box, a lens tube and shutter mounted at the bottom of the said hood, electrical means for operating the shutter, and an electric signal on the hood connected with said operating means for indicating the position of the shutter.

42. In a photographic camera, the combination with the body box thereof, of a hood positioned above said body box and provided with a taking opening at its front, an inclined mirror at the rear of the said hood, electrical means for spreading film for exposure at the bottom of said body box, and an electric signal upon the said hood connected with the said operating means for indicating the position of the film.

43. In a photographic camera, the combination with the body box thereof, of a hood at the top of said box and having an opening at the front of said hood, an inclined mirror at the rear of the hood, electrical means for spreading film for exposure at the bottom of the said body box, an electric signal on the hood connected with said operating means for indicating the position of the film, a lens tube and shutter at the bottom of the hood, electrical means for operating the shutter, and an electric signal on the hood connected with the shutter operating means for indicating the position of the shutter.

44. In a photographic camera, the combination with a body box of a hood provided with a taking opening at the front and with a signal opening at the rear, said hood being positioned at the top of said body box, an inclined mirror positioned at the rear of the hood, electrical means for spreading film for exposure at the bottom of the said box, and a lamp located within the hood adjacent to the signal opening and connected with the operating means for indicating the position of the film.

45. In a photographic camera, the combination with a body having an unexposed film support embodying an exposure opening, and means for drawing unexposed film past said exposure opening, of a visible, electrically controlled signal having a circuit including contact members associated with a metallic element of the film support but adapted to be insulated therefrom by portions of an unexposed film in said support.

46. In a photographic camera, the combination with a body having an unexposed film support embodying an exposure opening, and means for drawing an unexposed film past said opening, of lighting means acting as a signal and electrically controlled means for causing said light to function, said electrically controlled means including a circuit having contact members associated with a metallic element of the film support.

WILLIAM H. PETTT.
EDSON S. HINELINE.